(12) United States Patent
Ge et al.

(10) Patent No.: US 10,505,839 B2
(45) Date of Patent: Dec. 10, 2019

(54) UNICAST MESSAGE ROUTING USING REPEATING NODES

(71) Applicant: SIGNIFY HOLDING B.V., Eindhoven (NL)

(72) Inventors: Xiaodong Ge, Shenzhen (CN); Zhizhong Zhang, Shanghai (CN); Peiliang Dong, Shanghai (CN); Jun Jun Zhang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/767,811

(22) PCT Filed: Sep. 27, 2016

(86) PCT No.: PCT/EP2016/072916
§ 371 (c)(1),
(2) Date: Apr. 12, 2018

(87) PCT Pub. No.: WO2017/063866
PCT Pub. Date: Apr. 20, 2017

(65) Prior Publication Data
US 2018/0302317 A1    Oct. 18, 2018

(30) Foreign Application Priority Data

Oct. 13, 2015  (WO) ................. PCT/CN2015/000693
Nov. 27, 2015  (EP) ..................................... 15196701

(51) Int. Cl.
*H04L 12/707* (2013.01)
*H04L 12/703* (2013.01)
(Continued)

(52) U.S. Cl.
CPC ............ *H04L 45/22* (2013.01); *H04L 45/122* (2013.01); *H04L 45/28* (2013.01); *H04L 45/74* (2013.01);
(Continued)

(58) Field of Classification Search
CPC ....... H04L 45/122; H04L 45/22; H04L 45/28; H04L 45/74; H04W 40/24; H04W 40/125;
(Continued)

(56) References Cited

U.S. PATENT DOCUMENTS 8,203,971 B2  6/2012  Niranjan et al.
8,441,959 B2  5/2013  Erdmann et al.
(Continued)

FOREIGN PATENT DOCUMENTS

KR    100802508 B1    2/2008

OTHER PUBLICATIONS

G. Bhuvaneshwari et al, Reliable Wireless Patient Monitoring System Using Hybrid Transmission Protocol, Middle-East Journal of Scientific Research 20, (4): 468-474, 2014, ISSN 1990-9233, IDOSI Publications, 2014, DOI: 10.5829/dosi.mejsr.2014.20.04.21035.
(Continued)

*Primary Examiner* — Brian D Nguyen
(74) *Attorney, Agent, or Firm* — Daniel J. Piotrowski

(57) ABSTRACT

The present invention relates to a method for routing messages through a mesh network comprising a plurality of nodes, wherein a message is send from a sending node to a receiving node. The method comprises the steps of defining a routing table designating a path from a source node to a destination node through the mesh network, and defining a neighbor table listing one or more neighbor nodes from the plurality of nodes which are in the neighborhood of the
(Continued)

sending node. If the destination node is not in the neighbor table of the sending node, the message is transmitted by the sending node to a receiving node adapted to forward the message to the destination node in accordance with the routing table. The one or more neighbor nodes save the message in internal storage and a predetermined number of helping nodes from the one or more neighbor nodes repeat the message after respective predetermined time intervals have passed, wherein the number of helping nodes being smaller or equal than the number of neighbor nodes.

14 Claims, 4 Drawing Sheets

(51) Int. Cl.

| | | |
|---|---|---|
| *H04L 12/733* | (2013.01) | |
| *H04W 40/02* | (2009.01) | |
| *H04W 40/24* | (2009.01) | |
| *H04W 84/18* | (2009.01) | |
| *H04W 40/12* | (2009.01) | |
| *H04W 40/32* | (2009.01) | |
| *H04L 12/741* | (2013.01) | |

(52) U.S. Cl.
CPC ......... *H04W 40/02* (2013.01); *H04W 40/125* (2013.01); *H04W 40/24* (2013.01); *H04W 40/246* (2013.01); *H04W 40/32* (2013.01); *H04W 84/18* (2013.01)

(58) Field of Classification Search
CPC ..... H04W 40/32; H04W 40/02; H04W 84/18; H04W 40/246
See application file for complete search history.

(56) References Cited

U.S. PATENT DOCUMENTS

| | | |
|---|---|---|
| 2005/0117526 A1 | 6/2005 | Melink |
| 2009/0034419 A1 | 2/2009 | Flammer, III et al. |
| 2009/0088072 A1 | 4/2009 | Rofougaran et al. |
| 2012/0236748 A1 | 9/2012 | Brownrigg |
| 2012/0236778 A1 | 9/2012 | Erdmann et al. |
| 2013/0010767 A1 | 1/2013 | Wang et al. |
| 2013/0279410 A1* | 10/2013 | Dublin, III ............ H04W 40/02 370/328 |
| 2015/0195145 A1* | 7/2015 | Di Pietro ............ H04L 43/0876 706/12 |
| 2015/0200846 A1* | 7/2015 | Hui .......................... H04L 45/70 370/253 |
| 2016/0006778 A1* | 1/2016 | Beckhardt ........ H04N 21/42684 370/328 |
| 2016/0021613 A1* | 1/2016 | Mani ................. H04W 52/0209 370/311 |
| 2016/0027054 A1* | 1/2016 | Leppanen ........... H04W 40/246 705/14.57 |
| 2016/0029182 A1* | 1/2016 | Leppanen ............... H04W 4/08 455/416 |
| 2016/0219415 A1* | 7/2016 | Purohit ................... H04W 4/06 |

OTHER PUBLICATIONS

Xiaolei Cui, "Improving Zigbee Networks Robustness with Multi-channel Capability", Delft Univeristy of Technology, Thesis Report, pp. 1-67, No date.

Jeongho Son et al, "A Routing Scheme with Limited Flooding for Wireless Sensor Networks", International Journal of Future Generation Communication and Networking, vol. 3, No. 3, Sep. 2010, pp. 19-32.

Taehong Kim et al, "Neighbor Table Based Shortcut Tree Routing in ZigBee Wireless Networks", IEEE Transactions on Parallel and Distributed Systems, vol. 25, No. 3, Mar. 1, 2014 (Mar. 1, 2014), pp. 706-716, XP055268146, USISSN: 1045-9219, DOI: 10.1109/TPDS. 2014.9.

Gang Dig et al, "Reliable Broadcast in ZigBee Networks", Sensor and AD HOC Comminications and Networks, 2005, IEEE SECON 2005. 2005, Second Annual IEEE Communications Society Conference on Santa Clara, CA, USA Sep. 26-29, 2005, Piscataway, NJ, USA,IEEE, Sep. 26, 2005 (Sep. 26, 2005), pp. 510-520, XP010862027, DOI: 10.1109/SAHCN.2005.1557103, ISBN:978-0-7803-9011-9.

Davide Brunilli et al,"Improving Audio Streaming Over Multi-Hop ZigBee Networks", IEEE Symposium on Computers and Communications (ISCC 2008), Jul. 6-9, Marrakech, Morocco 2008, DOI 10.1109/ISCC.2008.4625771.

* cited by examiner

| Field Name | Description |
|---|---|
| Frame Control | |
| Sequence Number | |
| Destination Address | |
| Source Address | |
| Frame Payload | |
| Frame Checksum | |

FIG. 2

| Field Name | Description |
|---|---|
| Destination Address | |
| Status | |
| Next-hop address | |

FIG. 3

| Field Name | Description |
|---|---|
| Network Address | |
| Device type | |
| Relationship | |
| Transmission failure | |
| Link quality | |

FIG. 4

| Field Name | Description |
|---|---|
| (all fields from the original packet format) | |
| Crowd node count | the count of helping nodes from the neighbor nodes |
| Crowd algorithm | repeating or resending |

UNICAST MESSAGE ROUTING USING REPEATING NODES

CROSS-REFERENCE TO PRIOR APPLICATIONS

This application is the U.S. National Phase application under 35 U.S.C. § 371 of International Application No. PCT/EP2016/072916, filed on Sep. 27, 2016 which claims the benefit of Chinese Patent Application No. PCT/CN2015/000693, filed on Oct. 13, 2015 and European Patent Application No. 15196701.5, filed on Nov. 27, 2015. These applications are hereby incorporated by reference herein.

FIELD OF THE INVENTION

The present invention relates to message routing in mesh networks, in particular to unicast message routing in dense mesh networks using repeating nodes.

BACKGROUND OF THE INVENTION

With the advancing usage of wirelessly controlled application networks, such as for instance—but not limited to—mesh networks according to the ZigBee specification, in particular professional wireless lighting control applications, reliable transmission of control commands from a source node to a destination node constitutes an important aspect for a corresponding application. For instance, a command to switch on or off a main light or a series of lights in an important event in a big ballroom, a luxury hotel or a television show may be crucial in order to achieve the desired show effect. A corresponding control command is delivered from a central control node to a wireless receiving node inside a lighting device via many intermediate nodes, also referred to as forwarding nodes. Especially in a large network, routes between a source node and a receiving node may be very long. The success rate of a wireless transmission through a long path depends on many factors, such as the RF data rate, RF interferences, channel conditions, processing power of individual nodes. Especially in a large and dense wireless network with many nodes, the reliability of individual nodes is very poor.

It is known from "Neighbor Table Based Shortcut Tree Routing in ZigBee Wireless Networks", by Taehong Kim, et al., published in IEEE Transactions on Parallel and Distributed Systems, vol 25, No. 3, March 2014 that different tree routing schemes are known for ZigBee, wherein this paper introduces Shortcut Tree Routing. The main idea of the shortcut tree routing being to calculate remaining hops from an arbitrary source to the destination using the hierarchical addressing scheme in ZigBee and then having each source or intermediate node forward a packet to the neighbor node with the smallest remaining hops in its neighbor table.

It is further known from "Reliable Broadcast in ZigBee Networks", by Gang Ding, et al., published at Sensor and ad hoc Communications and Networks, 2005 that broadcasts in ZigBee networks are not very efficient; in line therewith a pruning broadcast algorithm is suggested that performs a forward node selection algorithm, this algorithm involves the selection of 1-hop neighbors to cover 2-hop neighbors that are known without exchanging information.

However, the influence of individual nodes is especially important for so called unicast transmissions where a sending node addresses a single destination node. In order to ensure proper transmission of a data message from one node to another, many network specifications, inter alia the ZigBee specification, use resubmission, acknowledgement feedback or combinations thereof. In the ZigBee specification, the reliability of a unicast transmission is handled by two layers. Every node that receives a data message provides a corresponding acknowledgement to be signaled to the sending nodes as feedback. When there is any interruption of a transmission along the delivering path, e.g. along one of a plurality of intermediate nodes, a data packet for which no acknowledgement has been received by the sending nodes will be transmit again until it reaches the next node. This retransmission based upon a missing acknowledgement, improves the reliability of a transmission. On the other hand, the time for delivering a data messages increases as well, since the retry mechanism is based on timeout: if a sending node fails to receive acknowledgement from the next node after a predetermined time interval has lapsed, the sending node will resend the message to the next node. All intermediate nodes along the delivering path use that mechanism resulting in a unicast delivering time that is highly variable depending on the delivering conditions of each individual node. The second layer of the reliability mechanism is the response feedback from the destination node of a unicast transmission. Upon receipt of the transmission from the source node the destination node will send back a packet or response to the source node, using the reversed delivering path from the destination node to the source node. If the source node has not received the response from the destination node after a given period of time, the source node will try to resend the message. This layer requires an even longer waiting time, since each node may need to issue a retry as explained herein above. If the delivering route is long, the uncertainty on the accumulated time intervals may be such that a delivering time is not predictable. Hence, the current ZigBee unicast algorithm performances well in simple networks with low external RF interference, but performance drops significantly in larger networks or in networks with heavy external RF interferences, e.g. from wireless mobile devices using different RF technologies. Simply introducing redundant concurrent delivering paths would increase the reliability of a proper data transmission. However, such an approach would have a negative impact on the unicast performance. It would reduce the delivering speed, and allocate more channel capacity.

SUMMARY OF THE INVENTION

It is thus an objective of the present invention to provide a more time constant or time predictable approach to deliver a unicast message from a source node to a destination node while maintaining or even improving the reliability of the data transmission from source to destination.

In an aspect of the invention, there is provided an apparatus for communicating messages to a receiving node in a wireless network, said apparatus comprising a receiver for detecting a message addressed to a destination node, sent from a transmitting node to a receiving node, a memory storage for storing a neighbor table specifying one or more neighbor nodes from the plurality of nodes which are in the neighborhood of the apparatus, a controller adapted to determine whether the receiving node is in the neighbor table of the apparatus, a buffer for storing the message, the receiver further for detecting retransmissions of the message addressed to the destination node by helping nodes from the one or more neighbor nodes, a transmitter configured, upon determination that the receiving node is included in the neighbor table, to retransmit to the receiving node the message as a helper node after a predetermined time interval has passed after detecting the message by the receiving node, and to prevent the retransmission upon detection that the number of retransmission of the message has exceeded a predetermined number of helping nodes, wherein the predetermined number of helping nodes is smaller than the number of neighbor nodes.

Thus, only nodes that are in the range of both the source node and the receiving node may retransmit to avoid nodes that are not in range of the receiving node to cause congestion.

In a first embodiment of this aspect of the invention, the receiver is configured to detect an acknowledgement from the receiving node for acknowledging the message, and the transmitter is configured to prevent the retransmission upon detection of the acknowledgment within the time interval.

In a second embodiment of this aspect of the invention which may be combined with the first embodiment, the time interval is selected randomly from a set of time intervals.

In a third embodiment of this aspect of the invention which may be combined with the first and second embodiments, the message includes an indication of the predetermined number of helping nodes.

In another aspect of the invention there is provided a method for routing messages through a mesh network comprising a plurality of nodes, wherein a message is sent from a sending node to a receiving node. The method comprises the steps of defining a routing table designating a path from a source node to a destination node through the mesh network, and defining a neighbor table specifying one or more neighbor nodes from the plurality of nodes which are in the neighborhood of the sending node. If the destination node is not in the neighbor table of the sending node, the message is transmitted by the sending node to a receiving node adapted to forward the message to the destination node in accordance with the routing table. The one or more neighbor nodes save the message in internal storage and a predetermined number of helping nodes from the one or more neighbor nodes repeat the message after respective predetermined time intervals have passed after detecting the message by the receiving node, wherein the number of helping nodes being smaller or equal than the number of neighbor nodes.

The present invention provides an approach to execute a unicast using concurrent multiple paths to increase the reliability of the packet delivery while greatly reducing the necessity for route discovery in case of link failures along the routing path resulting in a much lower failure rate, at the cost of slightly longer delivering times, but with a much lower uncertainty of the delivery delay. The balance between failure rate and delivering time may be adapted according to a concrete application scenario.

In an embodiment of the present invention repeating the message by the one or more helping nodes comprises replacing a sending node MAC layer address by the respective helping node MAC layer address.

In an embodiment of the present invention each respective neighbor node listens for the message saved in internal storage, increases a message count each time the message is received and only repeats the message after a respective time interval if the message count is smaller than the predetermined number of helping nodes.

In an embodiment of the present invention the predetermined number of helping nodes is comprised in a packet format of the message. The message could adjust the predetermined number of helping nodes easily without providing additional configuration messages. Hence, the balance between failure rate and delivering time can be adapted dynamically during operation.

In an embodiment of the present invention the predetermined number is preconfigured for each respective helping node. That is advantageous in case of a network having varying density or varying occupancy, e.g. some nodes may be relieved from helping duties by setting the crowd node counter to a low number or even zero. Furthermore, the message format would not have to be adapted to further configure the predetermined number as additional parameter.

In an embodiment of the present invention the one or more neighbor nodes listen for an acknowledgement from the receiving node and only repeat the message if the one or more neighbor has not detected an acknowledgement from the receiving node within the predetermined time interval. In this mode of operation the helping nodes will only repeat the message if they did not receive an acknowledgement from the receiving node. That way the traffic between the nodes may be reduced in case of proper transmission of the message from source to destination node.

In an embodiment of the present invention the sending node only resends the message if it does not receive an acknowledgement from the receiving node provided in response to the message transmitted by the source node or in response to a repeated message transmitted by any of the neighbor nodes.

In an embodiment of the present invention after reception of the message by the receiving node, the receiving node functions as sending node and a further node along the data functions as receiving node.

In an embodiment of the present invention the sending node is the source node.

It shall be understood that the apparatus of claim 1, the method of claim 5 and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 2 shows the ZigBee Packet Format with only essential elements

FIG. 3 shows the ZigBee Routing Table Entry Format with only essential elements FIG. 4 shows the ZigBee Neighbor Table Entry Format with only essential elements

DETAILED DESCRIPTION OF EMBODIMENTS

Embodiments are now described exemplary in the context of ZigBee communication networks. However, the person skilled in the art will appreciate that the presented application will work with any other network having a similar topology. Message, packet and data delivery or routing are used interchangeable. All shall be understood as data transmissions along a predetermined path.

Figure 1:
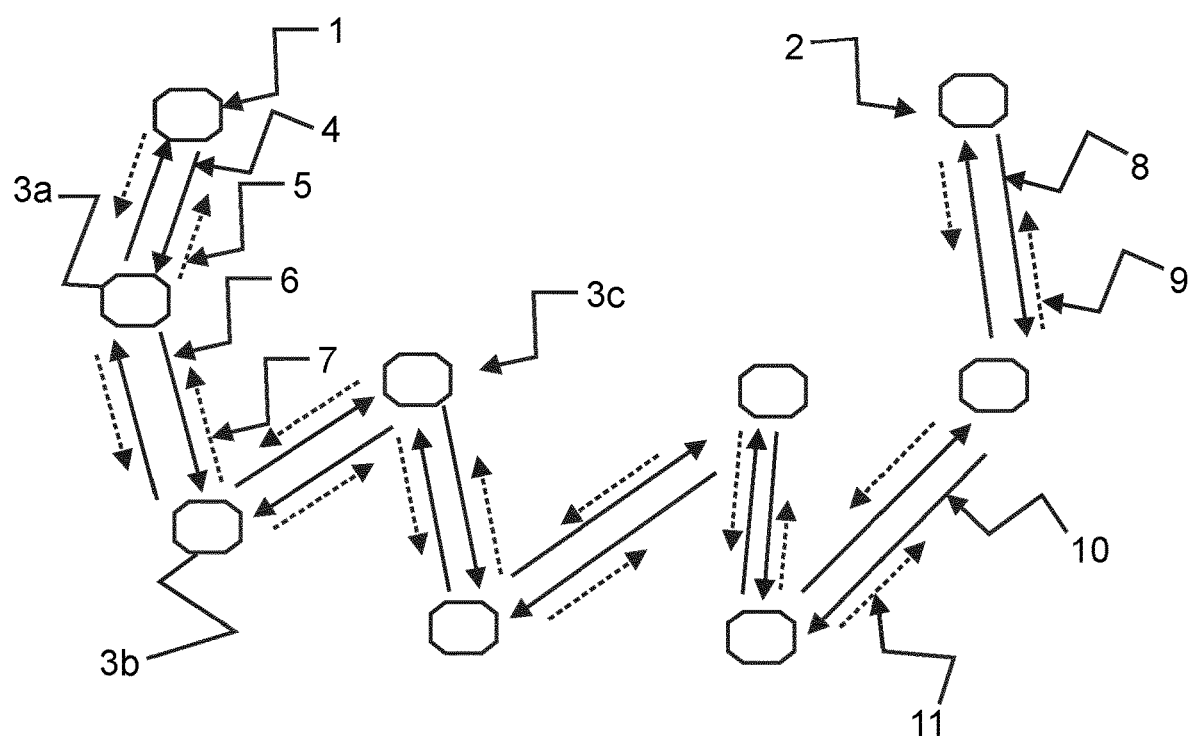
FIG. 1 shows unicast message delivery in a ZigBee mesh network according to the state of the art.

The ZigBee standard as currently implemented provides a unicast algorithm, for delivering messages from a source node to a destination node via a plurality of intermediate nodes as depicted in FIG. 1.

Before the source node 1 initiates the unicast command for delivering a message to the intended destination node 2, each node within the network prepares its neighbor table either by being programmed or within a self-learning algorithm, in which each node will send a message indicating a link-status at fixed intervals, e.g. 15 seconds. Each node that receives such a message from a neighboring node will add the sending node into its neighbor table if the neighbor table has empty entries left. In very dense networks there may be an upper limit to the neighbor table. In order to keep the table updated, a node is removed from the neighbor table in case its link-status message is not received, e g. 3 times in a row. Any other self-learning algorithm to detect other nodes within the transmission range of a sending node may be exploited to generate the neighbor table.

Figure 5:
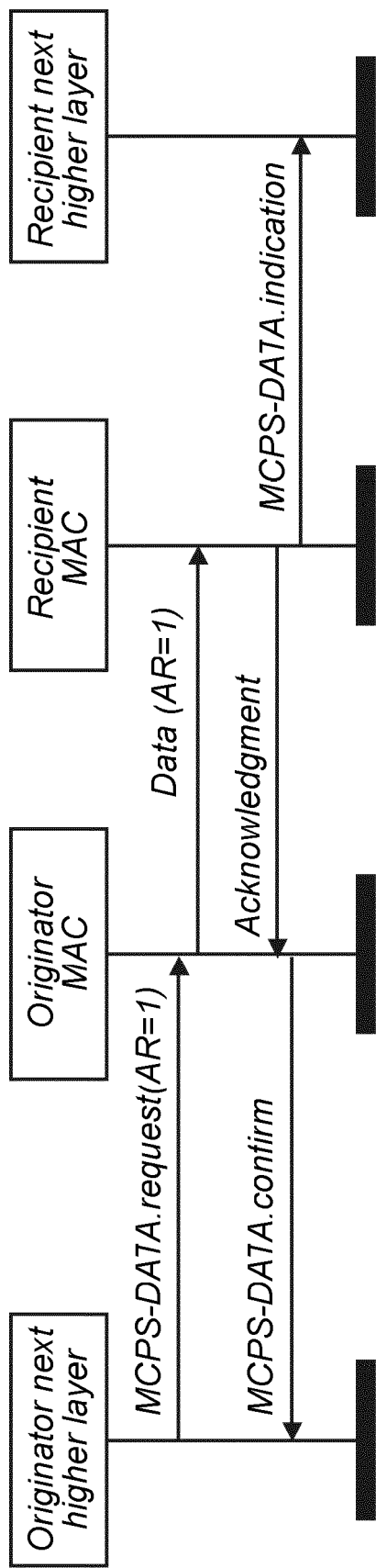
FIG. 5 shows ZigBee MAC layer data transmission with an acknowledgment

The source node 1 performs a route discovery for the destination node 1. The corresponding routing table is created for the destination node 2. During the source node performs a route discovery, the destination node 2 will perform a corresponding route discovery to create a corresponding routing table for the source node 1, which may either be a symmetric or asymmetric return path. In case of a symmetric return path the time required for route discovery should be the same as for both devices, in case of an asymmetric return path the times required for route discovery may differ for the respective devices. Upon determination of the routing path all intermediate nodes 3a, 3b, 3c along the path will create a corresponding routing table for both the source and destination nodes (both directions). If a unicast transmission is initiated by the source node 1, the source node will look for the routing path by searching the neighbor table and the routing table for the destination address, e.g. a network address or other unique identifier of the destination device 2. If the destination address is found in the neighbor table, there is no need for intermediate nodes forwarding the message packet(s). If the message delivery needs intermediate nodes 3a, 3b, 3c to forward the message to the destination node 2, the packet(s) will be send (4) to a first intermediate node 3a along the routing path, from where it is forwarded (6) to the next intermediate node 3b along the routing path and so on. Each node 3a, 3b, 3c, etc will check if there is any acknowledgement (5, 7) from the next node 3b, 3c, etc., indicating proper receipt of the packet delivery. The mechanism for ZigBee MAC layer data transmission with acknowledgement is shown in FIG. 5.

If there is no acknowledgement received, the sending node 1, 3a, 3b, 3c will retry to send the packet. If the number of retries exceeds a predetermined number, the sending node will assume the delivering path is damaged. It may either try to repair the remaining delivering path, e.g. by initiating a route discovery, or choose to stop sending if the path is not repairable. In the latter case the entire unicast will be stopped.

FIG. 2 shows the generic ZigBee packet format. The packet destination address, e.g. the network address of the destination node 2, is used for the unicast algorithm to locate the routing path from the routing table. FIG. 3 shows a routing table with the minimum entries relevant in this context. The 'next-hop'-address indicates the next intermediate node along the routing path to send a message to a corresponding destination address.

FIG. 4 shows the minimum entries relevant in this context of a neighbor table comprised in a node. When the network address of the destination node is comprised in the neighbor table, then the routing table will not be used. The unicast packet will be delivered directly to the destination node.

If a packet is successfully forwarded to the last node along the routing path, that is the destination node 2, the destination node will form a reply packet or response 8. This response will be delivered to the source node 2 using the same mechanism as described above, with a reversed routing path (symmetric case) or with a different routing path (asymmetric case).

If the source node does not receive the response packet after a predetermined timeout—either because any of the intermediate nodes stopped forwarding or the destination node failed to respond—the source node will assume the unicast failed and either can retry the whole process or give up.

The failure rate of the current ZigBee unicast algorithm can be calculated as follows:

$$F_U = 2 \times (n+1) \times (FP + FA)/r \quad \text{(Equation 1)}$$

where $F_U$ is the overall failure rate of the unicast, n is the number of intermediate nodes along the routing path, $F_P$ is the average failure rate of the packet forwarding, while the $F_A$ is the average failure rate of the acknowledgement, and the r is the number of retries in packet sending.

From equation 1, it can be seen that the unicast failure rate is proportional to the number of intermediate nodes n. The more nodes there are along the routing path, the higher the failure rate. In a large or dense network with many nodes, a long delivering path is unavoidable. A higher number of retries r can reduce the failure rate. However, this would lead to an increase of the overall delivering time once there is a permanent failure in the middle of the routing path, e.g. a broken or missing intermediate node.

The overall delivery time of the current ZigBee unicast algorithm can be calculated as follows:

$$T_U = 2 \times (n+1) \times ((T_P + T_A) \times r + T_R \times d) \quad \text{(Equation 2)}$$

where $T_U$ is the overall delivery time of the unicast, n is the number of intermediate nodes along the routing path, $T_P$ is the average sending time of the packet forwarding, $T_A$ is the average time for the acknowledgement, $T_R$ is the average time for the route discovery once an interruption along the routing path is detected, r is the number of retries in packet sending, and d is the average number of route discoveries for a node.

From equation 2, it can be seen that the unicast delivery time is proportional to the number of intermediate nodes n, and also to the number of retries r, the more nodes in the delivering path and/or the more number of retries, the longer is the delivery time. In a large or dense network with many nodes, the route discovery time is extremely expensive in terms of network bandwidth consumption or time spent. Route discovery should be avoided as much as possible, as it contributes to a much higher uncertainty of the delivery delay.

Figures 6, 7:
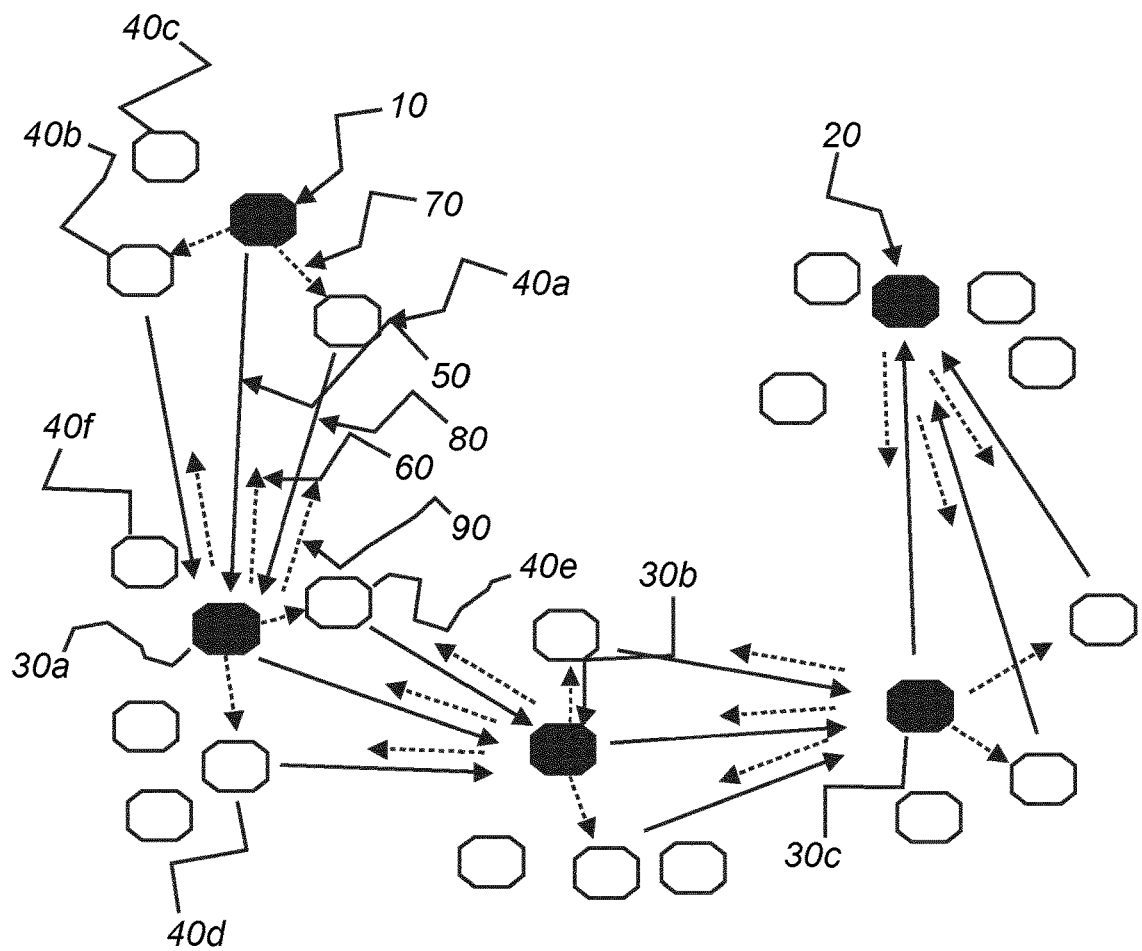
FIG. 6 shows the packet format for "crowdcast"
FIG. 7 shows a "crowdcast" delivering path

In an embodiment according to the present invention two parameters are added to the packet format used for message delivering in mesh networks as depicted in FIG. 6. A "crowd node count" parameter specifying a number of helping nodes to be used for the modified unicast message routing and an "algorithm type", defining the mode in which these helping nodes should be operated. Alternatively the crowd node count may be preconfigured for each node in the network during commissioning or even during operation. The following description will concentrate on the delta to the unicast message routing as it is described above.

FIG. 7 shows a unicast routing path from source node 10 to destination node 20 along a plurality of intermediate nodes 30a, 30b, 30c. A plurality of neighbor nodes 40a, 40b. 40c, 40d, 40e, 40f are determined for the source node, the destination node and for each of the nodes in the unicast delivering path. A unicast command in the new packet format according to FIG. 6 is initiated from the source node 10, and the packet is delivered to the first intermediate node 30a along the routing path. The packet is further overheard by the neighbor nodes 40a, 40b and 40c of the sending node and saved in internal storage. Furthermore, each neighbor node 40a, 40b and 40c sets an internal message count to zero. After a predetermined time period has passed neighbor node 40a determines whether that message count is smaller than the crowd node count defined in the received message according to the new format. Assuming a crowd node count of two, the message count of zero is smaller so that the neighbor node 40a repeats the message by replacing the source address network address of the source node 10—with its own network address and sends the message to the first intermediate node 30a. This repeated message is also overheard by neighbor nodes 40b and 40c which increase their internal, respective message counts by 1. After a further predetermined time period has passed neighbor node 40b determines whether the message count is smaller than the crowd node count defined in the received message according to the new format. The crowd node count of two is larger than the internal message count of neighbor node 40b, so that neighbor node 40b will also repeat the message by replacing the source address network address of the source node 10—with its own network address and send the message to the first intermediate node 30a, effectively forming a further routing path, or concurrent delivering. Again the neighbor nodes listen for repeated messages and increase their internal crowd node count by 1. Neighbor node 40c now determines that the crowd node count is equal to its internal message count and thus refrains from repeating the message. Hence, effectively, neighbor nodes 40a and 40b became helping nodes of source node 20 in delivering the original unicast message to the first intermediate node 30a.

In an example of this embodiment, to decide to participate to the crowdcast, the neighbor nodes may check whether the destination node is included in their neighbor list. If the destination node is not included in their neighbor list, the transmitter may prevent to transmit. Alternatively, the neighbor node may select a predetermined time period of high value to allow better located neighbor nodes to retransmit first.

According to the above described approach, the helping nodes repeat the message irrespective of the reception of an acknowledgement from the first intermediate node. This corresponds to a first algorithm type referred to as "repeating" and defined by the second parameter added to the packet format. This parameter is not mandatory but may be useful to balance the tradeoff between reliability and delivering time. By setting the second parameter added to the packet format to a second mode, e.g. "resending", repeating of a message may only be performed in case no acknowledgement is received by a neighbor node from the first intermediate node in order to avoid unnecessary traffic.

Generally, if a packet from source node 20 is received by the first intermediate node 30a an acknowledgement packet 60 from the first intermediate node 30a is send to source node 20. This acknowledgement packet is also overheard by the neighbor nodes 40a and 40b of the sending node (90). Hence, the neighbor nodes 40a and 40b can determine if the original packet has been successfully delivered.

After the packet has been successfully forwarded to the first intermediate node 30a along the routing path, this intermediate node 30a will repeat the above procedure to deliver the packet to the next intermediate node 30b along the routing path.

The packet destination address from the generic ZigBee packet format as shown in FIG. 2 is used for the packet delivering algorithm to locate a routing path from the routing table as depicted in FIG. 3. The new parameter crowd node count as shown in FIG. 6 in the new packet format is used to control how many neighbor nodes shall participate in the "crowd forwarding", in other words how many of the neighbor nodes shall act as helping nodes. This parameter may be chosen in dependence of the density and size of the mesh network. A further optional parameter may be set to determine the mode in which the helping nodes shall repeat or forward the packet, for instance, whether they shall repeat only in dependence of the "crowd node count" or additionally check whether an acknowledgement has been received. Again a tradeoff between reliability and redundancy level has to be made in dependence of the concrete application.

The selection of the helping nodes may be random, depending on which node reacts first. The selection may be performed according to the following steps:

a. all the nodes will listen for the transmissions within the mesh network;

b. only if the source MAC layer address of a received packet is in the neighbor table of a node, this node is considered a neighbor for the sending node and only then the packet is saved in internal storage;

c. a random waiting time is started for each of the neighbor node, d. after the respective timeout of a waiting period, each neighbor node is repeating the overheard packet, with the source MAC layer address replaced by the current device MAC layer address, e. at the same time, all the neighbor nodes are listening and counting for the same packet, f. if the same packet is heard "crowd node count" times, all the neighbor nodes will stop repeating this packet.

As for the generic ZigBee unicast sending node 20 will retry to send a packet if it does not receive a response from the receiving node. If the number of retries exceeds a predetermined number, the sending node will assume the routing path is damaged. It may start to repair the remaining routing path, e.g. start a routing discovery, or choose to stop sending if the path is not repairable. In the latter case the entire unicast will be stopped. If the packet is forwarded to the last node in the routing path, that is the destination node 20, the destination node will generate a reply packet as response, and this response will be delivered to the source node using the same mechanism using helping nodes for delivery, with the reversed routing direction, either using the same path (symmetric) or a different path (asymmetric). If the source node does not receive the response within a predetermined time, either because of any of the intermediate node stopped forwarding or the destination node failed to respond, the source node will assume the unicast failed and either retry the whole process or give up.

The failure rate of the above modified unicast algorithm (crowdcast) can be calculated as follows:

$$F_C(m,a)=2\times(n+1)\times(F_{PA}+F_A)/r/(m+1) \quad \text{(Equation 3)}$$

where $F_C$ is the overall failure rate of the crowdcast, m is the "crowd node count", or the maximum participating helping nodes, a is the "crowd algorithm type", n is the number of intermediate nodes participating the forwarding, $F_{PA}$ is the average failure rate of the packet forwarding with correction if a is of type "resending (repeat only if no acknowledgement is received)", while the $F_A$ is the average failure rate of the acknowledgement, and r is the number of retries in packet sending.

From equation 3, it can be seen that the failure rate is reduced if there is any neighbor node participating in repeating the message.

The overall delivery time of the modified unicast (crowdcast) algorithm can be calculated as follows:

$$T_C(m,a)=2\times(n+1)\times((T_{PA}+T_A)\times r+T_R\times d) \quad \text{Equation 4}$$

where $T_C$ is the overall delivery time of the crowdcast, m is the "crowd node count", or the maximum participating helping nodes, a is the "crowd algorithm type", n is the number of intermediate nodes participating the forwarding, $T_{PA}$ is the average sending time of the packet forwarding with correction if a is of type "resending", the $T_A$ is the average time for the acknowledgement, $T_R$ is the average time for the route discovery once there is an interruption in the middle of routing path, r is the number of retries in packet sending, and d is the average number of route discoveries for a node.

From equation 4, it can be seen that the modified unicast delivery time is increased if there is any neighbor node participating in repeating the message.

Whether the crowdcast algorithm is used in mode "repeating" or "resending (repeat only if no acknowledgement is received)" may be decided according to the needs of a concrete application to balance the needs for reliability on the one hand and the execution time on the other hand. The more nodes there are in "repeating" mode, the more reliable the packet transmission will be. On the other hand the "resending" mode accounts for the "RF multipath interference" issue, where one path may suffer from interference and the message cannot be transmitted properly but an alternative path from a helping node to the receiving node may not be affected from interference thus properly deliver the message, hence improve the reliability under RF interference.

The invention claimed is:

1. A method for routing messages through a mesh network comprising a plurality of nodes, wherein a message is sent from a sending node to a receiving node; the method comprising:
  defining a routing table designating a path from a source node to a destination node through the mesh network,
  defining a neighbor table specifying one or more neighbor nodes from the plurality of nodes which are in the neighborhood of the sending node,
  if the destination node is not in the neighbor table of the sending node, transmitting the message by the sending node to a receiving node adapted to forward the message to the destination node in accordance with the routing table, wherein the one or more neighbor nodes save the message in internal storage and a predetermined number of helping nodes from the one or more neighbor nodes repeat the message after respective predetermined time intervals have passed after detecting transmission or retransmission of the message, the number of helping nodes being smaller or equal the number of neighbor nodes.

2. The method according to claim 1, wherein repeating the message by the one or more helping nodes comprises replacing a sending node MAC layer address by a respective helping node MAC layer address.

3. The method according to claim 2, wherein each respective neighbor node listens for the message saved in internal storage, increases a message count each time the message is received and only repeats the message after a respective time interval if the message count is smaller than the predetermined number of helping nodes.

4. The method according to claim 3, wherein the predetermined number of helping nodes is comprised in a packet format of the message.

5. The method according to claim 3, wherein the predetermined number of helping nodes is preconfigured for each respective helping node.

6. The method according to claim 1, wherein the one or more neighbor nodes listen for an acknowledgement from the receiving node and only repeat the message if the one or more neighbor have not detected an acknowledgement from the receiving node within the predetermined time interval.

7. The method according to claim 1, wherein the sending node only resends the message if it does not receive an acknowledgement from the receiving node provided in response to the message transmitted by the source node or in response to a repeated message transmitted by any of the neighbor nodes.

8. The method according to claim 1 wherein after reception of the message by the receiving node, the receiving node functions as a further sending node and a further node along a data functions as a further receiving node.

9. The method according to claim 1 wherein the sending node is the source node.

10. A computer-readable, non-transitory medium having stored therein instructions for causing a processing unit to execute a method for routing messages through a mesh network comprising a plurality of nodes, wherein a message is sent from a sending node to a receiving node; the medium comprising code for:
  defining a routing table designating a path from a source node to a destination node through the mesh network,
  defining a neighbor table specifying one or more neighbor nodes from the plurality of nodes which are in the neighborhood of the sending node,
  if the destination node is not in the neighbor table of the sending node, transmitting the message by the sending node to a receiving node adapted to forward the message to the destination node in accordance with the routing table, wherein the one or more neighbor nodes save the message in internal storage and a predetermined number of helping nodes from the one or more neighbor nodes repeat the message after respective predetermined time intervals have passed after detecting transmission or retransmission of the message, the number of helping nodes being smaller or equal the number of neighbor nodes.

11. An apparatus for communicating messages to a receiving node,
  said apparatus comprising
  a receiver for detecting a message addressed to a destination node, sent from a transmitting node to a receiving node,
  a memory storage for storing a neighbor table specifying one or more neighbor nodes from a plurality of nodes which are in the neighborhood of the apparatus,
  a controller adapted to determine whether the receiving node is in the neighbor table of the apparatus, a buffer for storing the message, the receiver further for detecting retransmissions of the message addressed to the destination node by helping nodes from the one or more neighbor nodes, a transmitter configured, upon determination that the receiving node is included in the neighbor table, to retransmit to the receiving node the message as a helper node after a predetermined time interval has passed after detecting transmission or retransmission of the message, and to prevent the retransmission upon detection that the number of retransmission of the message has exceeded a predetermined number of helping nodes, wherein the predetermined number of helping nodes is smaller than the number of neighbor nodes.

12. The apparatus of claim 11, wherein the receiver is configured to detect an acknowledgement from the receiving node for acknowledging the message, and wherein the transmitter is configured to prevent the retransmission upon detection of the acknowledgment within the time interval.

13. The apparatus of claim 11, wherein the time interval is selected randomly from a set of time intervals.

14. The apparatus of claim 11, wherein the message includes an indication of the predetermined number of helping nodes.

* * * * *